(12) United States Patent
Brown

(10) Patent No.: US 9,336,612 B2
(45) Date of Patent: May 10, 2016

(54) CONTRAST-DEPENDENT RESOLUTION IMAGE

(75) Inventor: Kevin Brown, Chardon, OH (US)

(73) Assignee: KONINKLIJKE PHILIPS N.V., Eindhoven (NL)

(*) Notice: Subject to any disclaimer, the term of this patent is extended or adjusted under 35 U.S.C. 154(b) by 206 days.

(21) Appl. No.: 14/006,710

(22) PCT Filed: Mar. 16, 2012

(86) PCT No.: PCT/IB2012/051266
§ 371 (c)(1),
(2), (4) Date: Sep. 23, 2013

(87) PCT Pub. No.: WO2012/131520
PCT Pub. Date: Oct. 4, 2012

(65) Prior Publication Data
US 2014/0016849 A1   Jan. 16, 2014

Related U.S. Application Data

(60) Provisional application No. 61/468,126, filed on Mar. 28, 2011.

(51) Int. Cl.
G06K 9/40 (2006.01)
G06T 11/00 (2006.01)
G06T 5/50 (2006.01)

(52) U.S. Cl.
CPC .............. *G06T 11/003* (2013.01); *G06T 5/50* (2013.01); *G06T 11/008* (2013.01)

(58) Field of Classification Search
None
See application file for complete search history.

(56) References Cited

U.S. PATENT DOCUMENTS

| 4,463,375 A | 7/1984 | Macovski |
| 6,628,842 B1 * | 9/2003 | Nagao ................ G06T 5/004 348/607 |
| 6,633,342 B2 * | 10/2003 | Kim .................... H04N 5/213 348/606 |
| 6,724,942 B1 * | 4/2004 | Arai ............................. 382/254 |
| 6,778,692 B1 * | 8/2004 | Yazici ......................... 382/132 |
| 7,039,236 B2 * | 5/2006 | Hashimoto ............. G06K 9/38 382/218 |
| 7,404,797 B2 * | 7/2008 | Azuma et al. ................ 600/443 |
| 7,623,691 B2 * | 11/2009 | Hein et al. ................... 382/128 |
| 7,822,242 B2 * | 10/2010 | Kobayashi ........ F16K 31/0613 382/128 |
| 8,565,513 B2 * | 10/2013 | Shao et al. .................. 382/154 |
| 2002/0047911 A1 * | 4/2002 | Tsuchiya et al. ............. 348/252 |
| 2002/0150304 A1 * | 10/2002 | Ockman .................. G06T 5/50 382/260 |
| 2003/0081821 A1 | 5/2003 | Mertelmeier et al. |
| 2005/0063611 A1 | 3/2005 | Toki et al. |
| 2007/0014468 A1 * | 1/2007 | Gines et al. .................. 382/154 |
| 2007/0116343 A1 | 5/2007 | Sauer et al. |
| 2007/0145317 A9 * | 6/2007 | Kobayashi et al. ...... 251/129.15 |
| 2009/0245679 A1 * | 10/2009 | Ohwaki et al. ............... 382/260 |
| 2010/0266181 A1 | 10/2010 | Oeckl et al. |

FOREIGN PATENT DOCUMENTS

EP    1447773 A2    8/2004

* cited by examiner

*Primary Examiner* — Soo Park

(57) ABSTRACT

A method for processing one or more reconstructed images includes receiving a first reconstructed image having a first image resolution and receiving a second reconstructed image having a second image resolution. The first resolution is greater than the second resolution. The method further includes generating a contrast-dependent resolution image by combining the first and second reconstructed images single image so that the first reconstructed image contributes to a greater degree to the contrast-dependent resolution image for higher contrasts regions of the images and the second reconstructed image contributes to a greater degree to the contrast-dependent resolution image for lower contrasts regions of the images.

14 Claims, 5 Drawing Sheets

CONTRAST-DEPENDENT RESOLUTION IMAGE

CROSS REFERENCE TO RELATED APPLICATIONS

This application is a national filing of PCT application Serial No. PCT/IB2012/051266, filed Mar. 16, 2012, published as WO 2012/131520 A2 on Oct. 4, 2012, which claims the benefit of U.S. provisional application Ser. No. 61/468, 126 filed Mar. 28, 2011, which is incorporated herein by reference.

FIELD OF THE INVENTION

The following generally relates to generating an image, from reconstructed images, that includes contrast-dependent resolution and is described with particular application to computed tomography (CT), however, the following is also amenable to other imaging modalities such as hybrid PET/CT and/or MRI/CT systems, a digital x-ray system, and/or other imaging modality.

BACKGROUND OF THE INVENTION

A computed tomography (CT) scanner includes an x-ray tube mounted on a rotatable gantry that rotates around an examination region about a longitudinal or z-axis. The x-ray tube emits radiation that traverses the examination region and a subject or object therein. A detector array subtends an angular arc opposite the examination region from the x-ray tube. The detector array detects radiation that traverses the examination region (and the subject or object therein) and generates projection data indicative thereof. A reconstructor reconstructs the projection data and generates volumetric image data indicative thereof.

Unfortunately, CT scanners emit ionizing radiation and thus expose the patient to ionizing radiation, which may increase risk of cancer. Generally, the radiation dose deposited in the patient depends on multiple factors, including, but not limited to, tube current (mAs), tube voltage (kVp), exposure time (for helical scans), and slice thickness and spacing (for axial scans). As such, the deposited dose can be reduced by adjusting one or more of the above. However, image noise is inversely proportional to radiation dose, and thus reducing radiation dose not only reduces the dose deposited in the patient but also increases image noise in the acquired data, which is propagated to the images during reconstruction, reducing image quality (i.e., noisier images), which may degrade the diagnostic value of the procedure.

One approach to mitigating the increased noise is to use a statistical iterative reconstruction technique such as the Maximum Likelihood (ML) approach with a strong penalty on the noise in the image (e.g., a "penalized likelihood" or "regularization" approach). However, for low-contrast objects, e.g., where the contrast level is near the noise level, the regularization results in edges that may appear sharp in a single realization of noise, but actually contain a large amount of uncertainty due to the noise. This can be seen in FIG. 1, in which profiles 102 represents a sharp FBP reconstruction of a low contrast region of a scanned object and profiles 104 and 106 represent regularized ML iterative reconstructions of the low contrast region of the scanned object. As can be seen, the ML the profiles 104 and 106 have lower resolution than the FBP profile 102, and the mean of ML profiles 104 and 106 is less sharp than the FBP profile 102.

For multiple realizations of the noise, the heavily regularized images exhibit a contrast-dependent resolution in which, in the mean image, the regularized image will have a resolution less than but closer to that of a conventional filtered-backprojection (FBP) image with a very smooth filter in low-contrast regions while retaining a much sharper resolution in high contrast regions. Unfortunately, the forward and back projection operations of a regularized-likelihood iterative reconstruction are computationally expensive, even with acceleration of parallel hardware such graphic processing units (GPUs). As a consequence, iterative regularized-likelihood based reconstructions come with a large computational cost, which may hinder or prohibit their use in routine medical diagnostic practice.

SUMMARY OF THE INVENTION

Aspects of the present application address the above-referenced matters and others.

According to one aspect, a method for processing one or more reconstructed images includes receiving a first reconstructed image having a first image resolution and receiving a second reconstructed image having a second image resolution. The first resolution is greater than the second resolution. The method further includes generating a contrast-dependent resolution image by combining the first and second reconstructed images into a single image so that the first reconstructed image contributes to a greater degree to the contrast-dependent resolution image for higher contrast regions of the images and the second reconstructed image contributes to a greater degree to the contrast-dependent resolution image for lower contrast regions of the images.

According to another aspect, a system includes a contrast-dependent resolution image generator that generates a contrast-dependent resolution image by selectively blending a first reconstructed image having a first resolution and a second reconstructed imaged having a second resolution based on a contrast-dependent resolution weighting function.

According to another aspect, a computing readable storage medium encoded with computer readable instructions, which, when executed by one or more processors of a computing system, cause the computing system to selectively combine, in a single iteration, higher and lower resolution reconstructed images having regions of higher and lower contrast so as to generate a contrast-dependent resolution image with similar contrast-dependent resolution properties as a image generated using multiple iterations of a regularized iterative reconstruction.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 5 illustrates an example method for processing imaged data and generating a contrast-dependent resolution image there from.

DETAILED DESCRIPTION OF EMBODIMENTS

Figure 2:
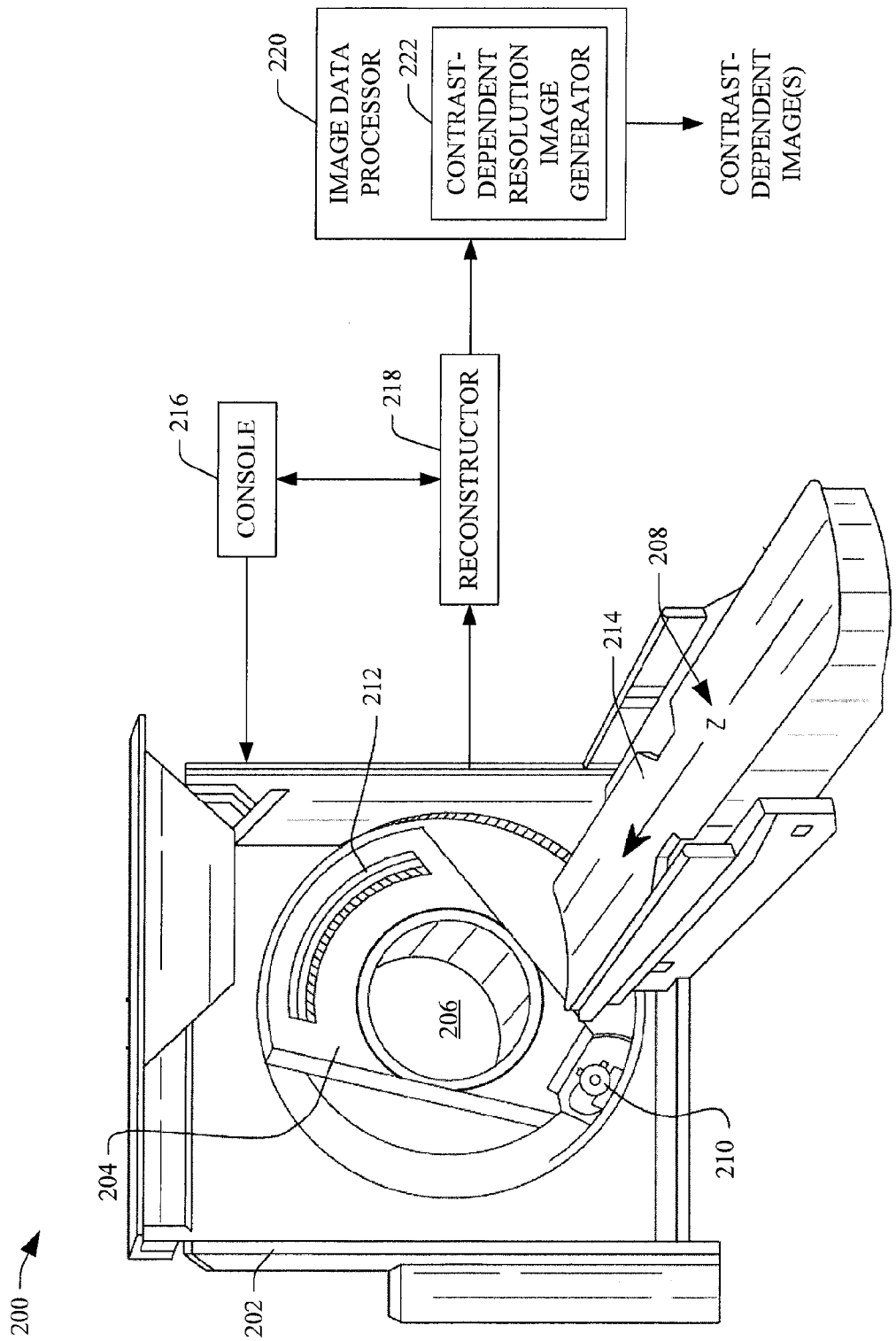
FIG. 2 schematically illustrates an example imaging system in connection with an image data processor and a contrast-dependent resolution image generator.

FIG. 2 illustrates an imaging system 200 such as a computed tomography (CT) scanner. The imaging system 200 includes a generally stationary gantry 202 and a rotating gantry 204. The rotating gantry 204 is rotatably supported by the stationary gantry 202 and rotates around an examination region 206 about a longitudinal or z-axis 208.

A radiation source 210, such as an x-ray tube, is rotatably supported by the rotating gantry 204. The radiation source 210 rotates with the rotating gantry 204 and emits radiation that traverses the examination region 206. A source collimator includes collimation members that collimate the radiation to form a generally cone, fan, wedge or otherwise shaped radiation beam.

A one or two-dimensional radiation sensitive detector array 212 subtends an angular arc opposite the radiation source 210 across the examination region 206. The detector array 212 includes a plurality of rows of detectors that extend along the z-axis 208 direction. The detector array 212 detects radiation traversing the examination region 206 and generates projection data indicative thereof.

A patient support 214, such as a couch, supports an object or subject such as a human patient in the examination region 206. The support 214 is configured to move the object or subject for loading, scanning, and/or unloading the object or subject.

A general-purpose computing system or computer serves as an operator console 216. A processor of the console 216 executes computer readable instructions stored on computer readable storage medium (e.g., physical memory), which allows an operator to control operation of the system 200 such as selecting a full dose or low dose scan protocol, generating a contrast-dependent resolution image, initiating scanning, etc.

A reconstructor 218 reconstructs the projection data and generates volumetric image data indicative thereof. The reconstructor 218 may employ a conventional filtered-backprojection reconstruction, a cone beam algorithm, an iterative algorithm and/or other algorithm. Furthermore, the reconstructor 218 may be utilized to generate images with higher, lower and/or other resolutions.

An image data processor 220 processes the image data. The illustrated image data processor 220 includes at least a contrast-dependent resolution image generator 222. In one instance, the contrast-dependent resolution image generator 222 combines or otherwise blends reconstructed images differing in resolution into a single image using a contrast-dependent resolution weighting function. The reconstructed images include a higher resolution image and a lower resolution image generated from the higher resolution image, or higher and lower resolution image reconstructions reconstructed from the same projection data. Moreover, the images can include both higher and lower contrast regions and/or objects.

As described in greater detail below, the above-noted weighting function applies a higher weight to the higher resolution image (and thus a lower weight to the lower resolution image) for higher contrasts regions of the images, and that applies a higher weight to the lower resolution image (and thus a lower weight to the higher resolution image) for lower contrasts regions of the images. In one instance, the resulting image has similar properties of contrast-dependant resolution as a regularized iterative reconstruction, but with much less computational cost. Furthermore, the edges in a single reconstruction image will give a more accurate reflection of the true accuracy with which the edge is known, instead of the somewhat false impression of a reliable edge which is given by a traditional regularized iterative image. Moreover, the noise pattern in background regions may appear less artificial to customers who are more used to typical FBP noise patterns.

In the illustrated embodiment, the image data processor 220 is shown as part of the system 200. In this instance, the image data processor 220 can be a separate component (as shown), part of the reconstructor 218, part of the console 216 and/or part of another component. In an alternative embodiment, the image data processor 220 can be remote from the system 200, for example, as part of a separate computing system, and/or distributed across computing system. Moreover, the image data processor 220 can be implemented via one or more processors executing one or more computer readable instructions embedded or encoded on computer readable storage medium (e.g., physical memory) and/or carried by a carrier wave or signal.

Figure 1:
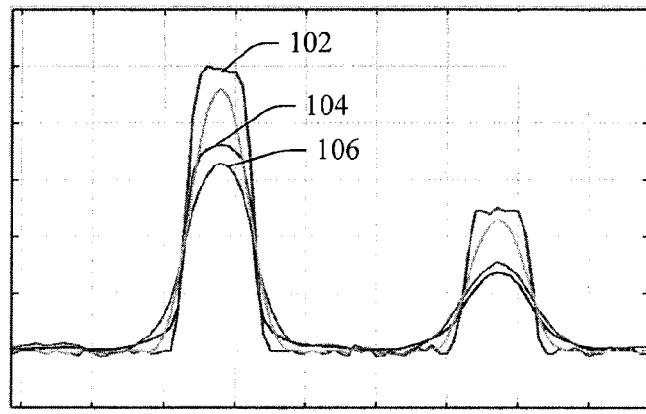
FIG. 1 graphically illustrates profiles for filtered back-projection (FBP) and penalized/regularized Maximum Likelihood (ML) iterative reconstructions for a low contrast region of a scanned object.
Figure 3:
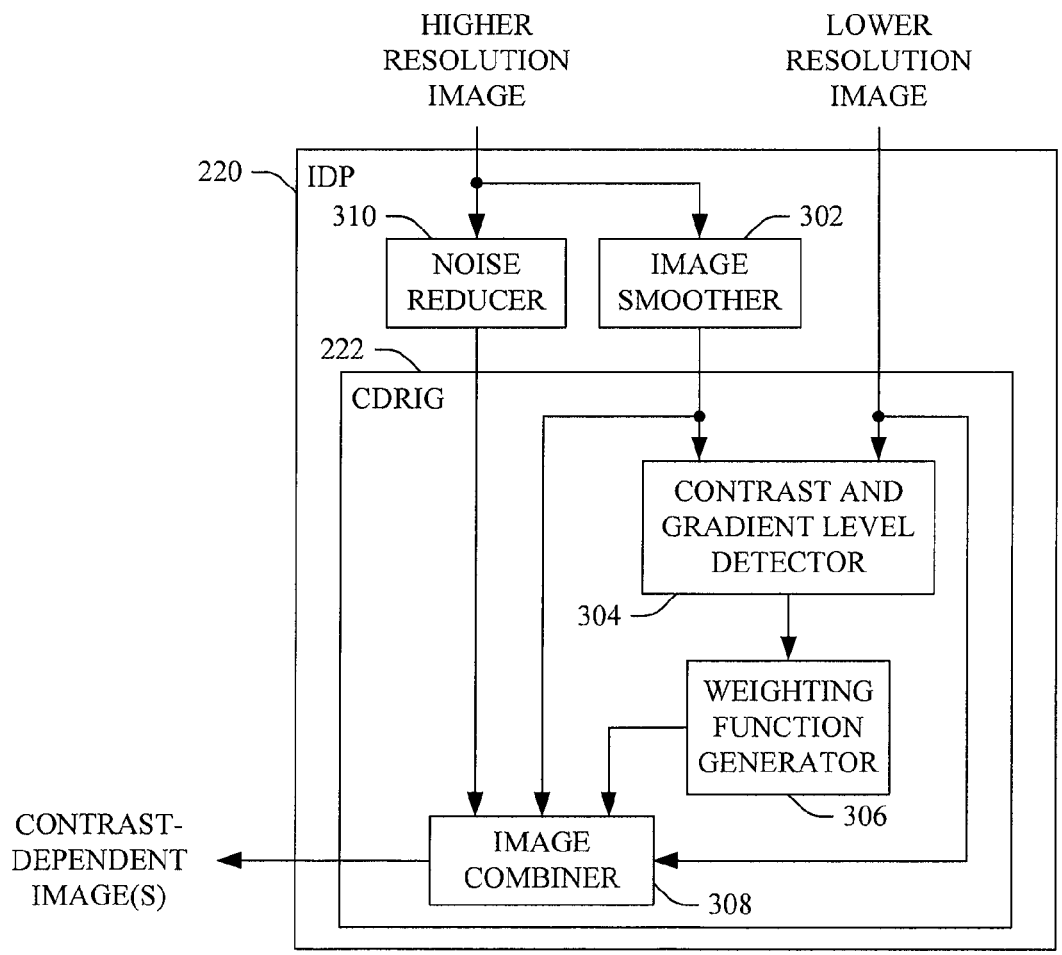
FIG. 3 schematically illustrates an example of the image data processor, the contrast-dependent resolution image generator, and an image combiner.

FIG. 3 schematically illustrates non-limiting examples of the image data processor (IDP) 220 and the contrast-dependent resolution image generator (CDRIG) 222. Other implementations are contemplated herein.

The illustrated image data processor 220 receives as input either a higher resolution image or the higher resolution image and a lower resolution image where both are reconstructed from the same projection data. The latter is shown in FIG. 3. In this instance, both the higher and the lower resolution images are provided to the contrast-dependent resolution image generator 222, and an image smoother 302 can be omitted.

However, where only the higher resolution image is provided to the image data processor 220, the image smoother 302 smoothes the higher resolution image, generating the lower resolution image of the higher resolution image, and both the higher and the generated lower resolution images are provided to the contrast-dependent resolution image generator 222.

The illustrated contrast-dependent resolution image generator 222 includes a contrast and gradient level detector 304. The contrast and gradient level detector 304 determines contrast and gradient levels of the lower resolution image. The contrast-dependent resolution image generator 222 generates and outputs a gradient image indicative of the contrast and gradient levels of the lower resolution image.

A weighting function generator 306 generates a weighting function that defines how to combine the lower and higher resolution images into a single image with a contrast-dependent resolution based on the gradient image. The generated weighting function is position-dependent in that its weights different regions of the images so that in regions of higher contrast, the high-resolution image contributes to a greater degree, and in regions of low contrast, the lower resolution image contributes to a greater degree. The weighting function generator 306 generates and outputs a signal indicative of the weighing function.

An image combiner 308 combines the higher and lower resolution images based on the weighing function determined by the weighting function generator 306 and generates and outputs the contrast-dependent resolution image. As described herein, the image combiner 308 employs the weighing function which blends the higher and lower resolution images so that the higher resolution image contributes to a greater degree to the contrast-dependent resolution image for higher contrasts regions and the lower resolution image contributes to a greater degree to the contrast-dependent resolution image for lower contrasts regions.

In the illustrated embodiment, the image data processor includes an optional noise reducer 310, which is used to reduce noise in the higher resolution image that is combined with the lower resolution image via the image combiner 308. The noise reducer 310 is configured to remove the large amounts of noise in the higher resolution image so that such noise does not cause a discontinuity in the combined image. The noise reducer 310 can employ any noise reduction algorithm configured to preserve edges and remove noise, such as the bilateral filter, ROF algorithm for Total Variation minimization, etc.

In FIG. 3, the noise reducer 310 and the image smoother 302 are shown as part of the image data processor 220. In another embodiment, at least one of the noise reducer 310 or image smoother 302 is part of the contrast-dependent resolution image generator 222. In another embodiment, at least one of the noise reducer 310 or image smoother 302 resides outside of the image data processor 220, for example, as part of the reconstructor 218, the console 216, and/or in another computing system.

Figure 4:
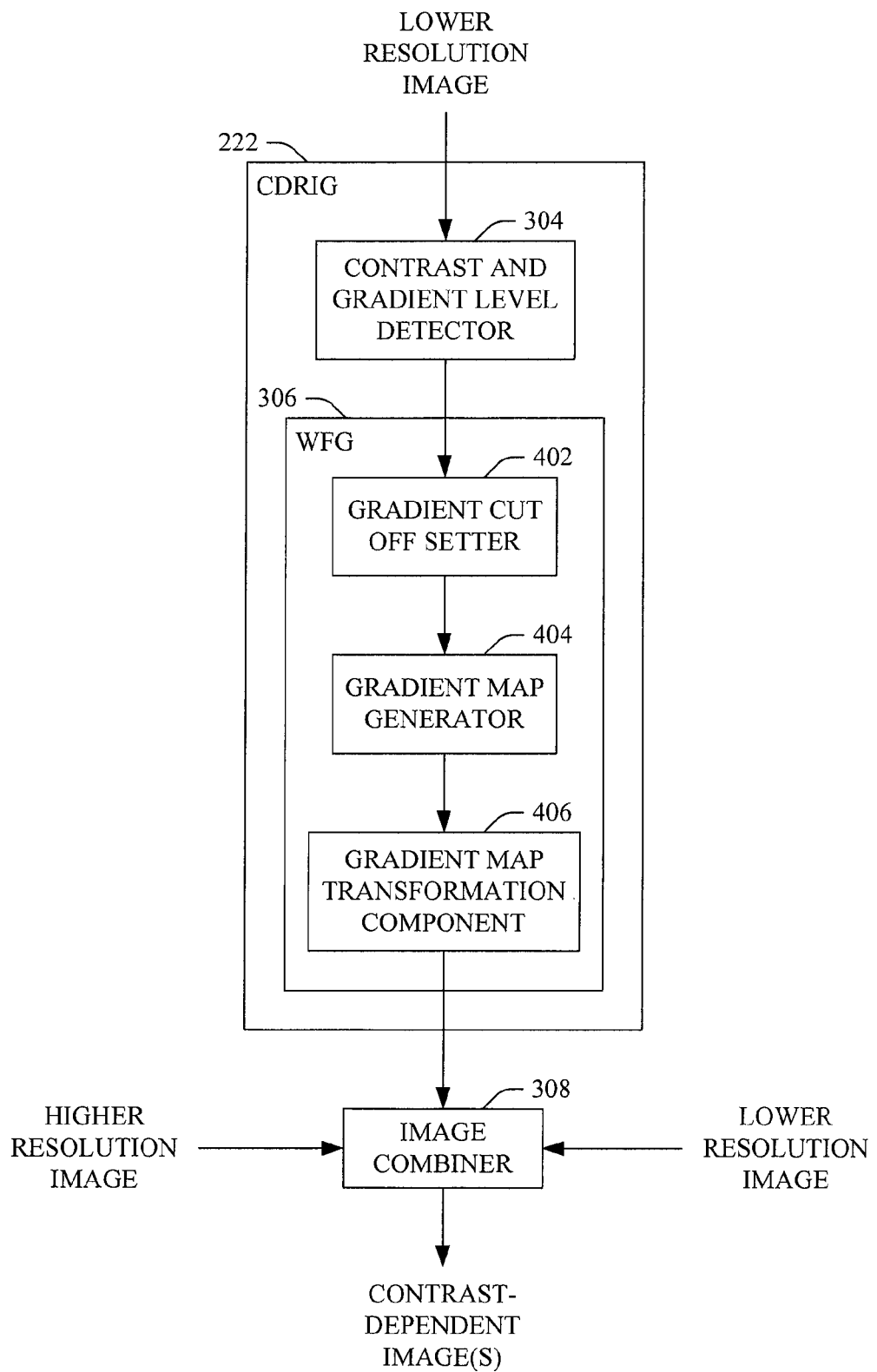
FIG. 4 schematically illustrates an example of a weighting matrix generator of the contrast-dependent resolution image generator.

FIG. 4 schematically illustrate a non-limiting example of the contrast and gradient level detector 304, the weighting function generator (WFG) 306, and the image combiner 308. Other implementations are also contemplated herein.

As discussed herein, the contrast and gradient level detector 304 determines contrast and gradient levels of the lower resolution image and outputs a gradient image. In this example, the contrast and gradient level detector 304 generates a gradient image represented as shown in EQUATION 1:

$$g = \sqrt{\left(\frac{\partial u}{\partial x}\right)^2 + \left(\frac{\partial u}{\partial y}\right)^2}, \quad \text{EQUATION 1}$$

wherein g represents the gradient image for the lower resolution image u(x,y).

A gradient cut off setter 402 sets a minimum gradient magnitude level ($g_{min}$) and a maximum gradient magnitude level ($g_{max}$) for the gradient image, which respectively determine the gradient cut-offs at which only the lower resolution image and only the higher resolution are used in generating the contrast-dependent resolution image. These values can be default, user determined, and/or adjustable, and generally are set to provide a desired visual presentation.

A gradient map generator 404 generates a gradient map which scales the gradients between values of zero (0) and one (1), as shown in EQUATION 2:

$$g_{map} = \frac{(g - g_{start})}{(g_{stop} - g_{start})}. \quad \text{EQUATION 2}$$

A gradient map transformation component 406 can be used to apply a function (e.g., a sinusoidal (as shown) or other function) to the gradient map that ensures a smooth transition on the weighting map, rendering the weighing function shown in EQUATION 3:

$$g_{wt} = \left(0.5 \cdot \sin\left(g_{map} \cdot \pi - \frac{\pi}{2}\right) + 0.5\right)^\alpha. \quad \text{EQUATION 3}$$

The image combiner 308 receives the weighing function, the higher resolution image and the lower resolution image, and generates the contrast-dependent resolution image based on EQUATION 4:

$$u_{blend} = g_{wt} \cdot u_{high} + (1 - g_{wt}) \cdot u_{low}, \quad \text{EQUATION 4:}$$

where the contrast-dependent resolution is a blended or weighted sum of the higher and lower resolution images.

Figure 5:
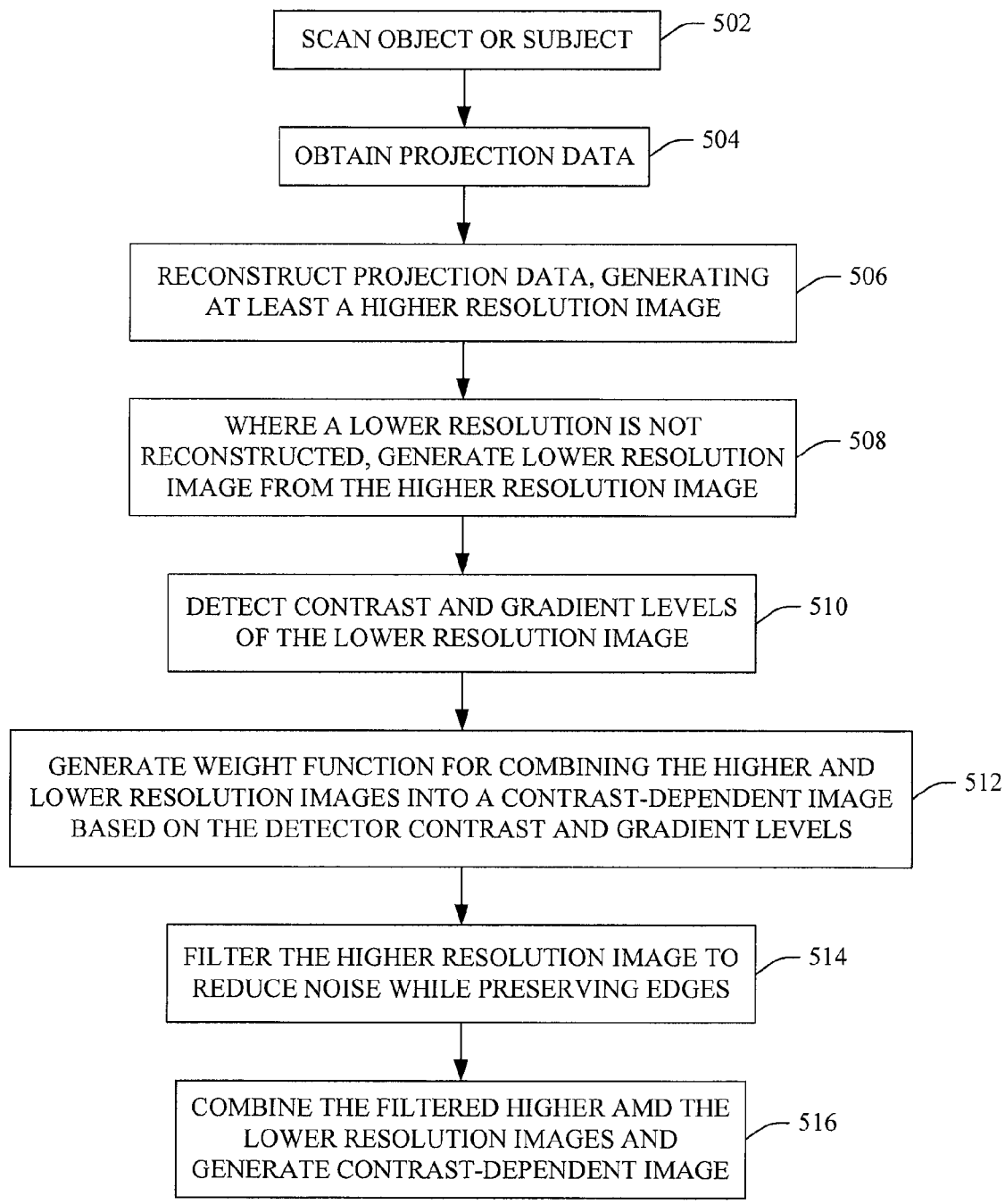

FIG. 5 illustrates an example method for processing image data and generating a contrast-dependent resolution image there from.

It is to be appreciated that the ordering of the acts in the methods described herein is not limiting. As such, other orderings are contemplated herein. In addition, one or more acts may be omitted and/or one or more additional acts may be included.

At 502, an object or subject is scanned via the imaging system 200 or other imaging system.

At 504, the projection data from the scan is obtained.

At 506, the projection data is reconstructed, generating at least a higher resolution image and, optionally, a corresponding lower resolution image.

At 508, where the corresponding lower resolution image is not generated from the projection data, a corresponding lower resolution image can be generated from the higher resolution image.

At 510, contrast and gradient levels of the lower resolution image are detected. As described herein, this information can be represented in a gradient image.

At 512, a weighting function for combining the higher and lower resolution images is generated based on the contrast and gradient levels as described herein or otherwise.

At 514, optionally, the higher resolution image is processed with an algorithm that reduces noise while preserving edges.

At 516, the filtered higher and the lower resolution images are combined based on the weighting function as described herein, producing a contrast-dependent resolution image.

The above may be implemented by way of computer readable instructions, which when executed by a computer processor(s), cause the processor(s) to carry out the described acts. In such a case, the instructions can be stored in a computer readable storage medium associated with or otherwise accessible to the relevant computer. Additionally or alternatively, one or more of the instructions can be carried by a carrier wave or signal.

Figure 6:
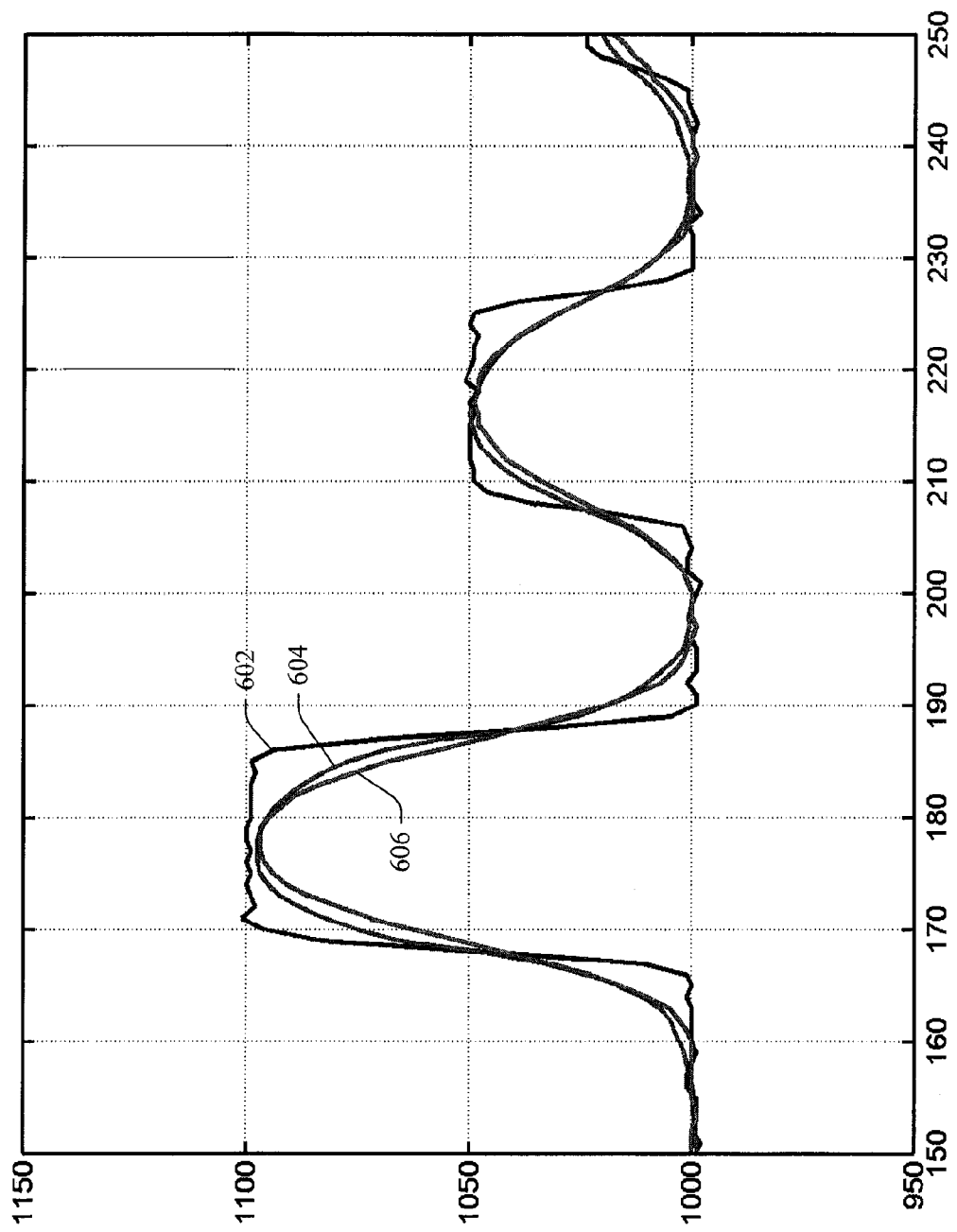
FIG. 6 graphically illustrates a profile for the contrast-dependent resolution reconstruction described herein relative to profiles for filtered backprojection (FBP) and the multi-iterative Maximum Likelihood (ML) reconstructions for a low contrast region of a scanned object.

FIG. 6 illustrates a resolution comparison between a profile 602 for a sharp FBP reconstruction, a profile 604 for a multi-iteration ML reconstruction, and a profile 606 for the contrast-dependent resolution reconstruction described herein. As shown, the resolution of the contrast-dependent reconstruction and the multi-iteration ML reconstruction are about the same. However, the contrast-dependent reconstruction is a single pass reconstruction, which is less computationally expensive relative to the multi-iteration ML reconstruction.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method for processing one or more reconstructed images, comprising:
   receiving a first reconstructed image having a first image resolution;
   receiving a second reconstructed image having a second image resolution, wherein the first resolution is greater than the second resolution;
   generating a gradient map based at least on the second reconstructed image;
   transforming the gradient map with a function that ensures smooth weighting transitions;
   generating a weighting function based on the transformed gradient map; and
   generating a contrast-dependent resolution image by combining, based on the weighting function, the first and second reconstructed images into a single image so that the first reconstructed image contributes to a greater degree to the contrast-dependent resolution image for higher contrasts regions of the images and the second reconstructed image contributes to a greater degree to the contrast-dependent resolution image for lower contrasts regions of the images.

2. The method of claim 1, further comprising:
   detecting a contrast and gradient levels of the second reconstructed image;
   generating a gradient image based on the detected contrast and gradient levels; and
   generating the gradient map based on the gradient image.

3. The method of claim 2, further comprising:
   setting a predetermined minimum gradient magnitude level and a predetermined maximum gradient magnitude level for the gradient image, wherein the predetermined minimum and maximum gradient magnitude levels respectively indicate gradient levels at which only the second reconstructed image is used for the contrast-dependent resolution image and only the first reconstructed image is used for the contrast-dependent resolution image; and
   generating the gradient map based on the gradient image with the minimum and maximum gradient magnitude levels.

4. The method of claim 3, wherein the gradient map scales gradients from zero to one.

5. The method of claim 1, further comprising:
   reducing noise in the first reconstructed image; and
   generating the contrast-dependent resolution image by combining the reduced noise first reconstructed image and the second reconstructed image.

6. The method of claim 5, wherein reducing noise in the first reconstructed image includes applying a noise reduction algorithm that reduces noise in the first reconstructed image while preserving edges in the first reconstructed image.

7. The method of claim 1, wherein generating the contrast-dependent resolution image includes employing a non iterative and non likelihood based approach to generate the contrast-dependent resolution image.

8. The method of claim 1, wherein the first reconstructed image is generated by reconstructing projection data from a scan of an object or subject with an imaging system, and the second reconstructed image is generated by reconstructing the projection data or from the first reconstructed image.

9. A system, comprising:
   a contrast-dependent resolution image generator that generates a contrast-dependent resolution image by selectively blending a first reconstructed image having a first higher resolution and a second reconstructed imaged having a second lower resolution based on a contrast-dependent resolution weighting function generated by applying a sinusoidal function to transform a gradient map.

10. The system of claim 9, wherein the weighting function weights the higher resolution image to a higher degree for higher contrasts regions of the images and the weights the lower resolution image to a higher degree for lower contrasts regions of the images.

11. The system of claim 10, further comprising:
    a noise reducer that reduces noise in the higher resolution image, wherein the contrast-dependent resolution image generator generates the contrast-dependent resolution image with the reduced noise higher resolution image.

12. The system of claim 9, the contrast-dependent resolution image generator, comprising:
    a contrast and gradient level detector that detects a contrast and gradient level of the lower resolution image and generates a gradient image indicative thereof;
    a weighting function generator that generates the contrast-dependent resolution weighting function based on the gradient image; and
    an image combiner that combines the first and second images based on the contrast-dependent resolution weighting function.

13. The system of claim 12, the weighting function generator, comprising:
    a gradient cut off setter that sets a minimum and a maximum gradient level for the gradient image; and
    a gradient map generator that generates the gradient map based on the gradient image and the minimum and maximum gradient levels; and
    a gradient map transformation component that transforms the gradient map into the weighting function.

14. The system of claim 9, wherein the weighting function describes how to combine the images into a single contrast-dependent resolution image.

* * * * *